US012058498B2

(12) United States Patent
Tseng et al.

(10) Patent No.: US 12,058,498 B2
(45) Date of Patent: Aug. 6, 2024

(54) NOISE DETECTION DEVICE AND METHOD THEREOF

(71) Applicant: LUXSHARE-ICT CO., LTD., Taipei (TW)

(72) Inventors: Chien-Kai Tseng, Taipei (TW); Dang-Yao Jheng, Taipei (TW); Chuan-Hsin Chang, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 169 days.

(21) Appl. No.: 17/961,421

(22) Filed: Oct. 6, 2022

(65) Prior Publication Data

US 2023/0114896 A1 Apr. 13, 2023

(30) Foreign Application Priority Data

Oct. 12, 2021 (TW) ................................ 110137851

(51) Int. Cl.
*H04R 29/00* (2006.01)
*G10L 25/51* (2013.01)

(52) U.S. Cl.
CPC .............. *H04R 29/00* (2013.01); *G10L 25/51* (2013.01)

(58) Field of Classification Search
CPC ................................ H04R 29/00; G10L 25/51
See application file for complete search history.

(56) References Cited

U.S. PATENT DOCUMENTS

| | | | | |
|---|---|---|---|---|
| 2006/0183470 | A1* | 8/2006 | Koivukangas | H04W 24/00 455/423 |
| 2012/0323571 | A1 | 12/2012 | Song et al. | |
| 2013/0129097 | A1* | 5/2013 | Park | H04M 1/24 381/56 |
| 2022/0263933 | A1* | 8/2022 | Kurihara | H04M 1/24 |
| 2023/0076338 | A1* | 3/2023 | Kurihara | G10L 25/60 |

FOREIGN PATENT DOCUMENTS

| | | | |
|---|---|---|---|
| CN | 101355829 | A | 1/2009 |
| CN | 102970646 | A | 3/2013 |
| CN | 104661169 | A | 5/2015 |
| CN | 104807540 | A | 7/2015 |
| CN | 107346665 | A | 11/2017 |
| CN | 110307994 | A | 10/2019 |
| CN | 111163310 | A | 5/2020 |
| CN | 111726740 | A | 9/2020 |
| CN | 109362016 | B | 5/2021 |
| TW | I452293 | B | 9/2014 |
| TW | I631857 | B | 8/2018 |
| TW | I669965 | B | 8/2019 |

* cited by examiner

*Primary Examiner* — Simon King
(74) *Attorney, Agent, or Firm* — Birch, Stewart, Kolasch & Birch, LLP

(57) ABSTRACT

A noise detection method includes: inputting a key audio signal with multiple frequencies to an audio device to be tested; measuring a first output audio signal emitted by the audio device to be tested; performing an audio analysis on the first output audio signal to generate a measurement signal; and comparing the measurement signal with a qualified signal to generate a comparison result, and determining whether the first output audio signal has noise based on the comparison result.

20 Claims, 7 Drawing Sheets

NOISE DETECTION DEVICE AND METHOD THEREOF

CROSS-REFERENCE TO RELATED APPLICATION

This non-provisional application claims priority under 35 U.S.C. § 119(a) to Patent Application No. 110137851 filed in Taiwan, R.O.C. on Oct. 12, 2021, the entire contents of which are hereby incorporated by reference.

BACKGROUND

Technical Field

The present application relates to an audio technology, especially a noise detection device and method thereof.

Related Art

The audio device is a device capable of performing energy conversion between electrical energy and sound energy, such as speakers, earphones, recorders, and so on. Due to some process factors (e.g., air leakage) or some operation processes (e.g., the vibration and collision of the coil and the diaphragm), causing the audio signal emitted by the audio device may be noisy. Since the audio device gradually adopts a smart amplifier, and the smart amplifier is used to enable the audio device to operate in the ultimate condition, causing the noise in the audio signal to be more detectable by the user.

In order to detect and eliminate the noise, before shipping or during maintenance, a step frequency sweep test is generally used to detect the noise in the audio signal of the audio device, thereby performing elimination on the noise. However, the audio signal played by the user through the audio device generally has a complex frequency and/or has an irregular amplitude variation. The step frequency sweep test only can test an audio signal of a single frequency, causing the audio signal corrected by the step frequency sweep test may still have noise. Furthermore, since hearing senses of different people and different listening environments will affect the noise determination made by an artificial listening manner, the audio signal corrected by the artificial listening manner may also still have noise.

SUMMARY

In view of the above, the present application provides a noise detection device and method thereof. According to some embodiments, the present application can accurately detect whether the audio signal with a complex frequency and/or irregular amplitude variation has noise, so as to assist in performing accurate noise correction or determining whether the noise correction performed on the audio signal is effective. In some embodiments, the present application can further detect the amount of appearing noise.

According to some embodiments, the noise detection method includes: inputting a key audio signal with multiple frequencies to an audio device to be tested; measuring a first output audio signal emitted by the audio device to be tested; performing an audio analysis on the first output audio signal to generate a measurement signal; and comparing the measurement signal with a qualified signal to generate a comparison result, and determining whether the first output audio signal has noise based on the comparison result.

According to some embodiments, the noise detection device includes an input-output circuit, a measurement circuit, and a processing circuit. The input-output circuit is configured to input a key audio signal with multiple frequencies to an audio device to be tested. The measurement circuit is configured to measure a first output audio signal emitted by the audio device to be tested. The processing circuit is configured to perform an audio analysis on the first output audio signal to generate a measurement signal, compare the measurement signal with a qualified signal to generate a comparison result, and determine whether the first output audio signal has noise based on the comparison result.

In sum, according to some embodiments, through the key audio signal with multiple frequencies and/or irregular amplitude variation, the measurement signal of the audio device to be tested is caused to have multiple frequencies and/or irregular amplitude variation. Through the comparison result generated by comparing the measurement signal with the qualified signal corresponding to the qualified audio device, whether the audio signal emitted by the audio device to be tested has noise or not can be accurately determined.

BRIEF DESCRIPTION OF THE DRAWINGS

The disclosure will become more fully understood from the detailed description given herein below for illustration only, and thus not limitative of the disclosure, wherein.

DETAILED DESCRIPTION

Some of the used terms "audio signal" and "signal" in the disclosure are implemented in electrical form (such as key audio signal, measurement signal, and qualified signal), and some are implemented in sound form (such as output audio signal).

Figure 1:
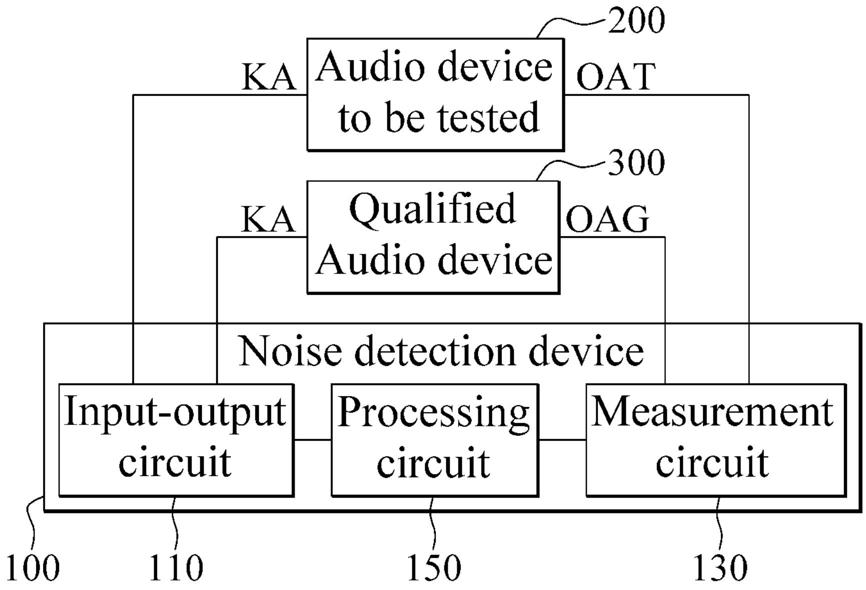
FIG. 1 illustrates a schematic block diagram of a noise detection device and application thereof according to some embodiments of the present application.

Refer to FIG. 1. FIG. 1 illustrates a schematic block diagram of a noise detection device 100 and application thereof according to some embodiments of the present application. The noise detection device 100 includes an input-output circuit 110, a measurement circuit 130, and a processing circuit 150. The processing circuit 150 is electrically connected to the input-output circuit 110 and the measurement circuit 130. The input-output circuit 110 is electrically connected to at least one audio device (e.g., an audio device to be tested 200 and a qualified audio device 300) for audio transmission with the audio device. The measurement circuit 130 performs sound recording on the at least one audio device for measuring the audio signal emitted by the audio device. The audio device may be a device with the function of playing sounds, such as a speaker, an earphone, a recorder, or a radio. The input-output circuit 110 may be a circuit with audio input and output functions, such as an audio interface card or an audio connector. The measurement circuit 130 may be a circuit with a sound collection function, such as a microphone. The processing circuit 150 may be an operation circuit with an audio processing function, such as a central processing unit, a system on a chip, or a microprocessor.

In some embodiments, the input-output circuit 110 includes multiple input-output sub-circuits to respectively perform audio transmission with different audio devices. In some embodiments, the measurement circuit 130 includes multiple measurement sub-circuits to respectively perform sound recording on different audio devices.

Figure 2:
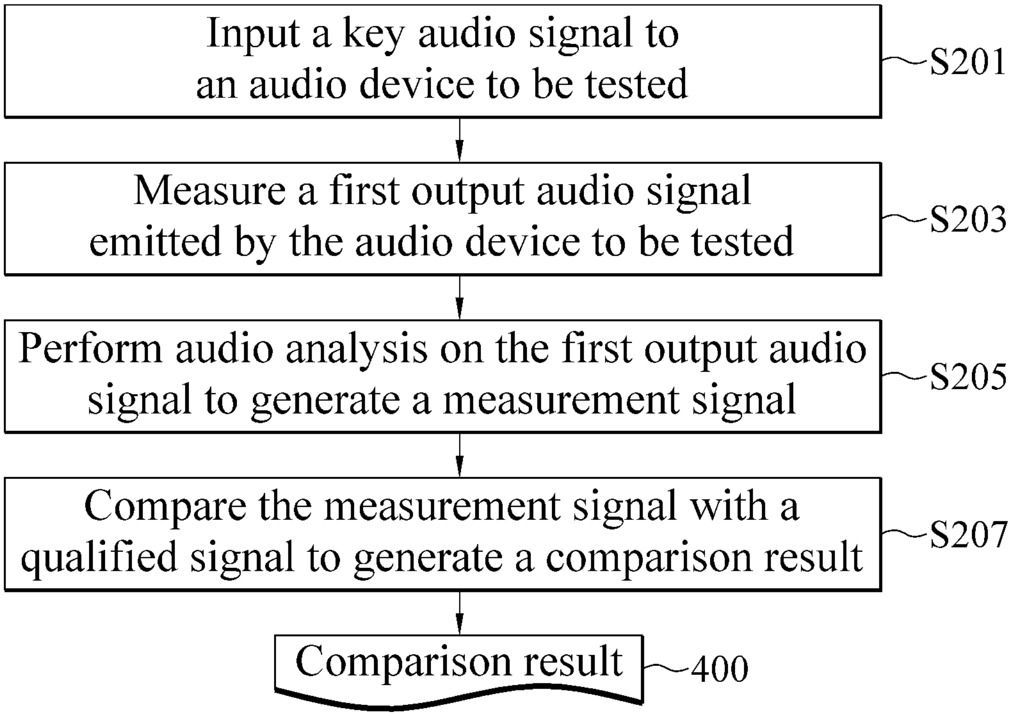
FIG. 2 illustrates a schematic flow chart of a noise detection method according to some embodiments of the present application.

Refer to FIG. 2. FIG. 2 illustrates a schematic flow chart of a noise detection method according to some embodiments of the present application. The noise detection method is adapted to be executed by the processing circuit 150. First, the processing circuit 150 controls the input-output circuit 110 to input a key audio signal KA with multiple frequencies to an audio device to be tested 200 (step S201). The audio device to be tested 200 is an implementation object of noise detection. Next, the processing circuit 150 controls the measurement circuit 130 to measure an output audio signal (hereinafter referred to as a first output audio signal OAT) emitted by the audio device to be tested 200 (step S203). After that, the processing circuit 150 performs audio analysis on the first output audio signal OAT to generate a measurement signal (step S205) and compares the measurement signal with a qualified signal to generate a comparison result 400 (step S207). The qualified signal is obtained according to the output audio signal of the qualified audio device 300. The qualified audio device 300 is an audio device that has detected and corrected the noise. In other words, the qualified audio device 300 is an audio device without noise. The comparison result 400 is configured to indicate whether the first output audio signal OAT has noise. That is to say, based on the comparison result 400, the processing circuit 150 can determine whether the first output audio signal OAT has noise, thereby can perform an elimination procedure against the noise. In this way, it is ensured that the noise in the first output audio signal OAT is effectively eliminated.

In some embodiments, the qualified audio device 300 and the audio device to be tested 200 are the same types of audio devices. In this way, the accuracy of determining whether the first output audio signal OAT has noise can be improved.

In some embodiments of step S207, the processing circuit 150 can compare whether the measurement signal is substantially consistent with the qualified signal. When the measurement signal is substantially consistent with the qualified signal, the processing circuit 150 generates a comparison result 400 of "without noise" and determines the first output audio signal OAT does not have noise. When the measurement signal is not substantially consistent with the qualified signal, the processing circuit 150 generates a comparison result 400 of "with noise" and determines the first output audio signal OAT has noise.

In some embodiments, the key audio signal KA has a multi-frequency audio signal composed of multiple frequencies on a time domain, and the multiple frequencies of the multi-frequency audio signal of the key audio signal KA have an irregular amplitude variation on the time domain. For example, at least two frequencies of the multi-frequency audio signal of the key audio signal KA separately produce irregular amplitude variation over time. In other words, the amplitudes of the at least two frequencies will not always keep consistent in the time domain, nor will they maintain regular amplitude variation. For example, the key audio signal KA may be a segment audio file captured from music or an audio file recorded from the environment, and the multiple frequencies of the multi-frequency audio signal of this kind of audio file have irregular amplitude variation on the time domain. In contrast, the multi-frequency audio signal of an audio file synthesized from multiple single-frequency audio signals has a uniform amplitude or a regular amplitude variation in the time domain.

Since the music played by the user through the audio device generally has a complex frequency and irregular amplitude variation (e.g., the music is synthesized by superimposing a multi-frequency audio signal on a multi-frequency audio signal), if only use step frequency sweep test (i.e., use the audio signal of non-complex frequency, uniform amplitude, or regular amplitude variation for testing) to detect and correct noise, it may cause the music still appear noise. Therefore, by using the key audio signal KA (e.g., take the music that produces noise in actuality when using an audio device as the key audio signal KA), the flow of detecting noise can be simplified (e.g., no need to repeatedly use different audio files to detect noise), the accuracy of detecting noise can be improved, and the matching degree between the audio device and the hearing sense of the actual user can be improved.

Figure 3:
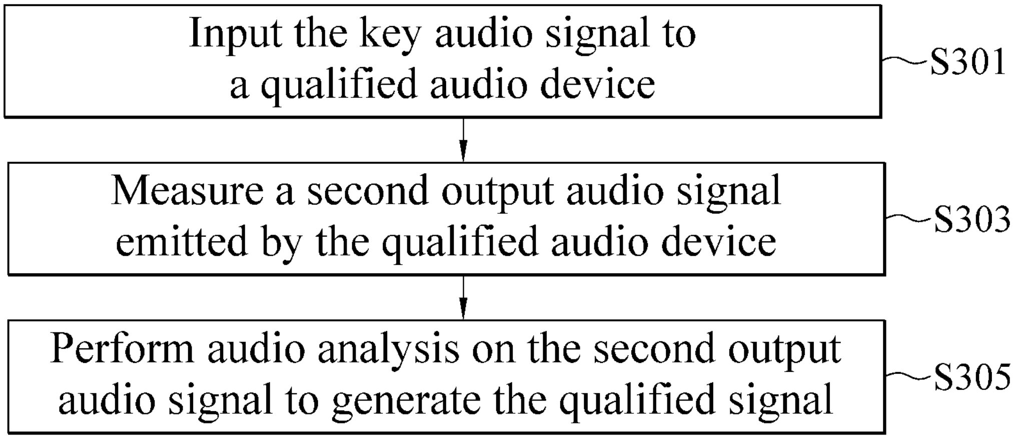
FIG. 3 illustrates a schematic flow chart of generating a qualified signal according to some embodiments of the present application.

Refer to FIG. 3. FIG. 3 illustrates a schematic flow chart of generating a qualified signal according to some embodiments of the present application. In some embodiments, first, the processing circuit 150 controls the input-output circuit 110 to input the key audio signal KA to the qualified audio device 300 (step S301). Next, the processing circuit 150 controls the measurement circuit 130 to measure an output audio signal (hereinafter referred to as a second output audio signal OAG) emitted by the qualified audio device 300 (step S303). After that, the processing circuit 150 performs audio analysis on the second output audio signal OAG to generate the qualified signal (step S305). Since the qualified audio device 300 has undergone noise detection and noise correction, the second output audio signal OAG does not have noise, and the qualified signal also does not have the energy of the noise. Therefore, by inputting the same key audio signal KA to the qualified audio device 300 and the audio device to be tested 200 and performing the same audio analysis, the qualified signal and the measurement signal are compared under the same base, thereby ensuring the accuracy of noise detection.

In some embodiments, the qualified signal is input by the user through the input-output circuit 110. In some embodiments, the qualified signal is pre-stored in the processing circuit 150 or a storage circuit (not shown) of the noise detection device 100. For example, after generating the qualified signal through steps 301 to 305, the processing circuit 150 stores the qualified signal in itself or a storage circuit for subsequent use directly (e.g., when performing step S207, the qualified signal is obtained and used directly from the processing circuit 150 or the storage circuit), and there is no need to perform sound recording and signal processing each time when it wants to use the qualified signal. The storage circuit is electrically connected to the processing circuit 150. The storage circuit may be a volatile storage medium (such as random access memory) or a non-volatile storage medium (such as read-only memory).

Figure 4:
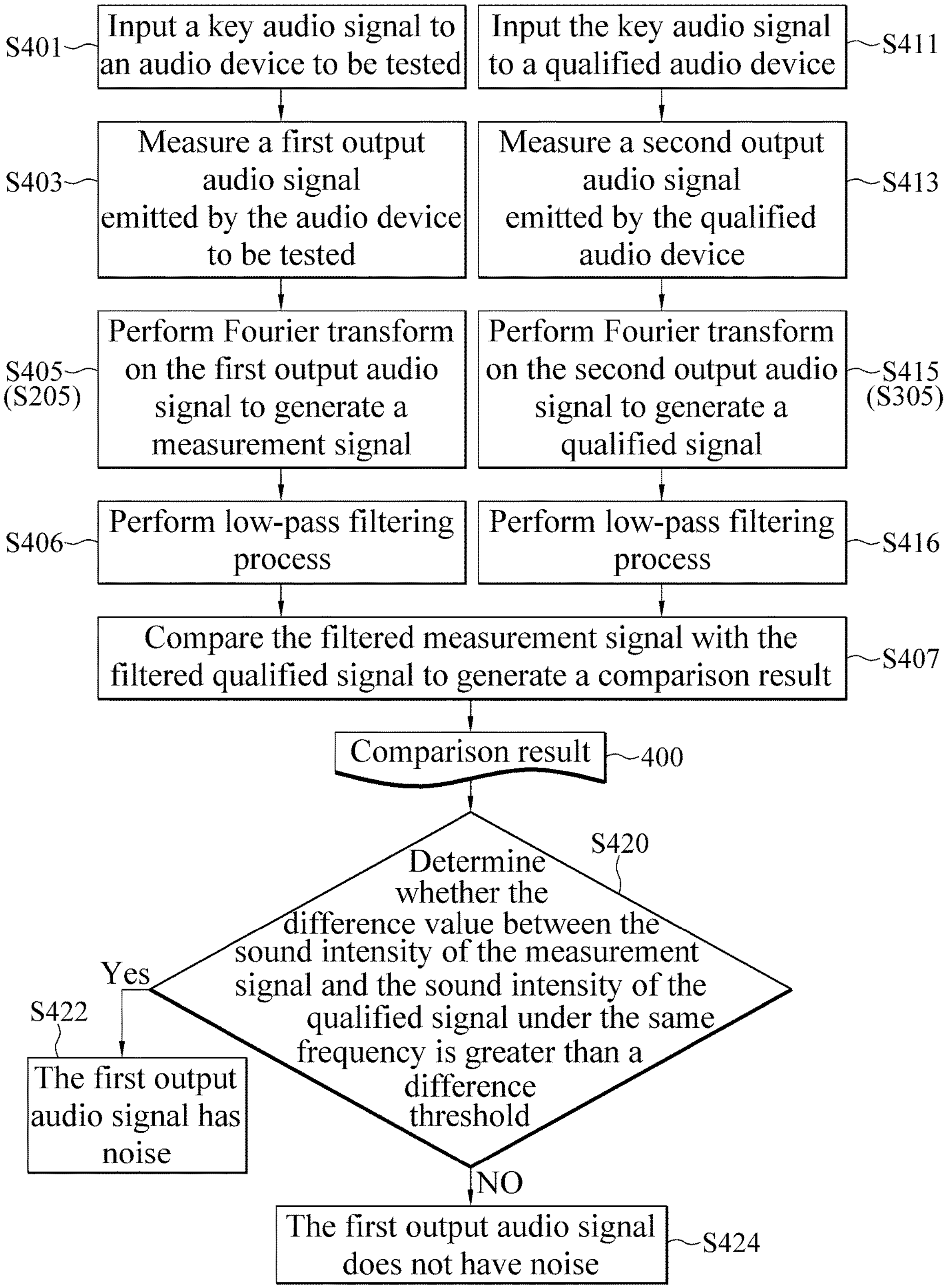
FIG. 4 illustrates a schematic flow chart of a noise detection method according to some embodiments of the present application.

Refer to FIG. 4, illustrating a schematic flow chart of a noise detection method according to some embodiments of the present application. Since steps S401, S403, S411, and S413 are respectively the same as steps S201, S203, S301, and S303, they will not be repeated here. In some embodiments, the step of the processing circuit 150 performing audio analysis on the first output audio signal OAT to generate the measurement signal (step S205) includes the processing circuit 150 performing Fourier transform on the first output audio signal OAT to generate the measurement signal (step S405). Similarly, in some embodiments, the step of the processing circuit 150 performing audio analysis on the second output audio signal OAG to generate the qualified signal (step S305) includes the processing circuit 150 performing Fourier transform on the second output audio signal OAG to generate the qualified signal (step S415). Wherein, the processing circuit 150 may perform the same Fourier transform on the measurement signal and the qualified signal. The Fourier transform can transform a time-domain signal into a frequency domain signal. The processing circuit 150 transforms the first output audio signal OAT in the time domain into an amplitude spectrum signal in the frequency domain (i.e., measurement signal) through the Fourier transformation. The processing circuit 150 transforms the second output audio signal OAG in the time domain into an amplitude spectrum signal in the frequency domain (i.e., qualified signal) through the Fourier transformation.

In some embodiments, as shown in FIG. 4, before performing the comparison, the processing circuit 150 performs a low-pass filtering process on the measurement signal to generate a filtered measurement signal (step S406). Similarly, in some embodiments, before performing the comparison, the processing circuit 150 performs a low-pass filtering process on the qualified signal to generate a filtered qualified signal (step S416). Wherein, the processing circuit 150 may perform the same low-pass filtering process on the measurement signal and the qualified signal. After that, in step S407, the processing circuit 150 compares the filtered measurement signal with the filtered qualified signal to generate a comparison result 400.

Figure 5:
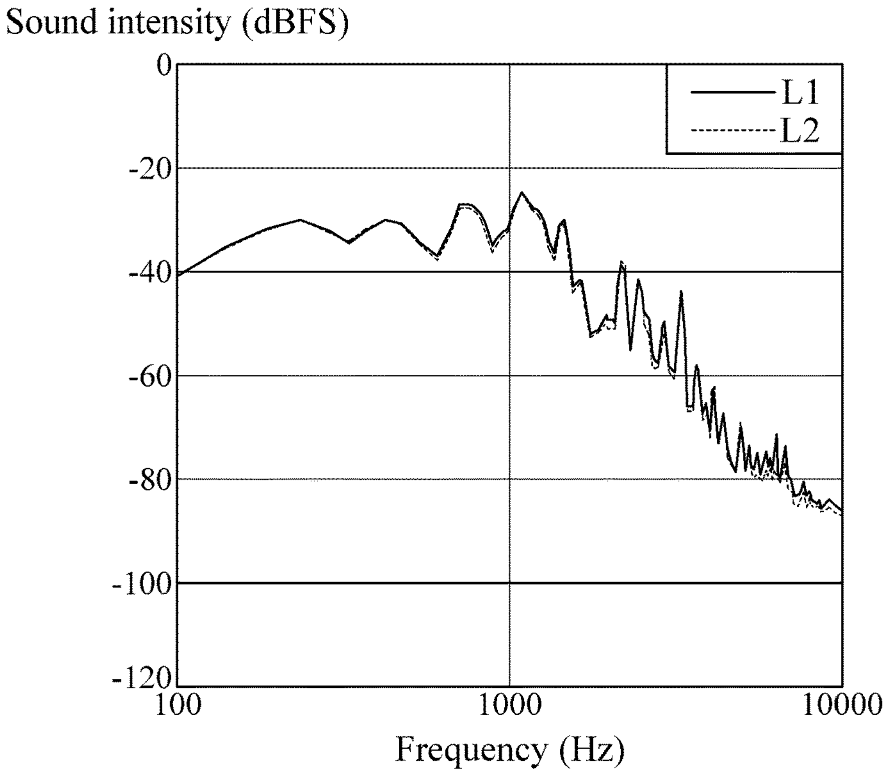
FIG. 5 illustrates a schematic diagram of the measurement signal and qualified signal of a comparison example of the present application.
Figure 6:
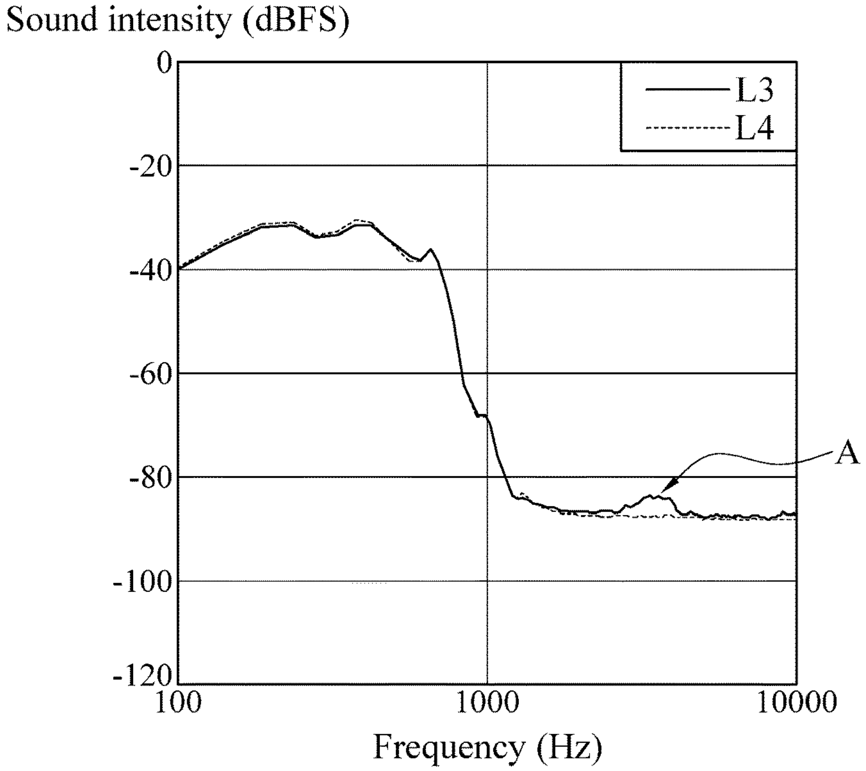
FIG. 6 illustrates a schematic diagram of the measurement signal and qualified signal according to some embodiments of the present application.

Refer to FIG. 5 and FIG. 6. FIG. 5 illustrates a schematic diagram of the measurement signal and qualified signal of a comparison example of the present application. FIG. 6 illustrates a schematic diagram of the measurement signal and qualified signal according to some embodiments of the present application. The noise is generally caused by large-scale collisions or vibrations, and the noise appears in higher harmonics after the Fourier transformation (i.e., high-frequency energy). The output audio signal emitted from the audio device through the key audio signal KA or the music played by the user through the audio device also has high-frequency energy after undergoing the Fourier transformation. The higher harmonics of the noise are generally much smaller than the high-frequency energy of the output audio signal or the high-frequency energy of the music and are covered by the output audio signal or the music. Therefore, adding the step of low-pass filtering helps to determine the difference between the measurement signal and the qualified signal. In other words, by comparing the measurement signal processed by the low-pass filtering with the qualified signal processed by the low-pass filtering, it can be quickly determined whether the first output audio signal OAT has noise. For example, as shown in FIG. 5, a curve L1 (represented by the solid line) is the unfiltered measurement signal, and a curve L2 (represented by the dashed line) is the unfiltered qualified signal. As shown in FIG. 6, a curve L3 (represented by the solid line) is the filtered measurement signal, and a curve L4 (represented by the dashed line) is the filtered qualified signal. Wherein, the measurement signals of the curve L1 and curve L3 have noise energy. It can be seen from FIG. 5 that the noise energy of the curve L1 is not obvious due to the higher harmonics of the noise are covered by the output audio signal or the music. That is, there is no obvious difference between the curve L1 and curve L2. It can be seen from FIG. 6 that there is an obvious difference between curve L3 and curve L4 at position A. That is, curve L3 has noise energy at position A. In this embodiment, FIG. 5 and FIG. 6 show diagrams of the frequency response curves of frequency (Hz) versus sound intensity (dBFS).

In some embodiments, the order of step S406 and step S205 (or step S405) can be interchanged. That is, after measuring out the first output audio signal OAT, the processing circuit 150 performs the low-pass filtering process on the first output audio signal OAT to generate the filtered first output audio signal OAT and performs audio analysis (e.g., Fourier transform) on the filtered first output audio signal OAT to generate the filtered measurement signal. Similarly, in some embodiments, the order of step S416 and step S305 (or step S415) can be interchanged. That is, after measuring out the second output audio signal OAG, the processing circuit 150 performs the low-pass filtering process on the second output audio signal OAG to generate the filtered second output audio signal OAG and performs audio analysis (e.g., Fourier transform) on the filtered second output audio signal OAG to generate the filtered qualified signal.

Figure 7:
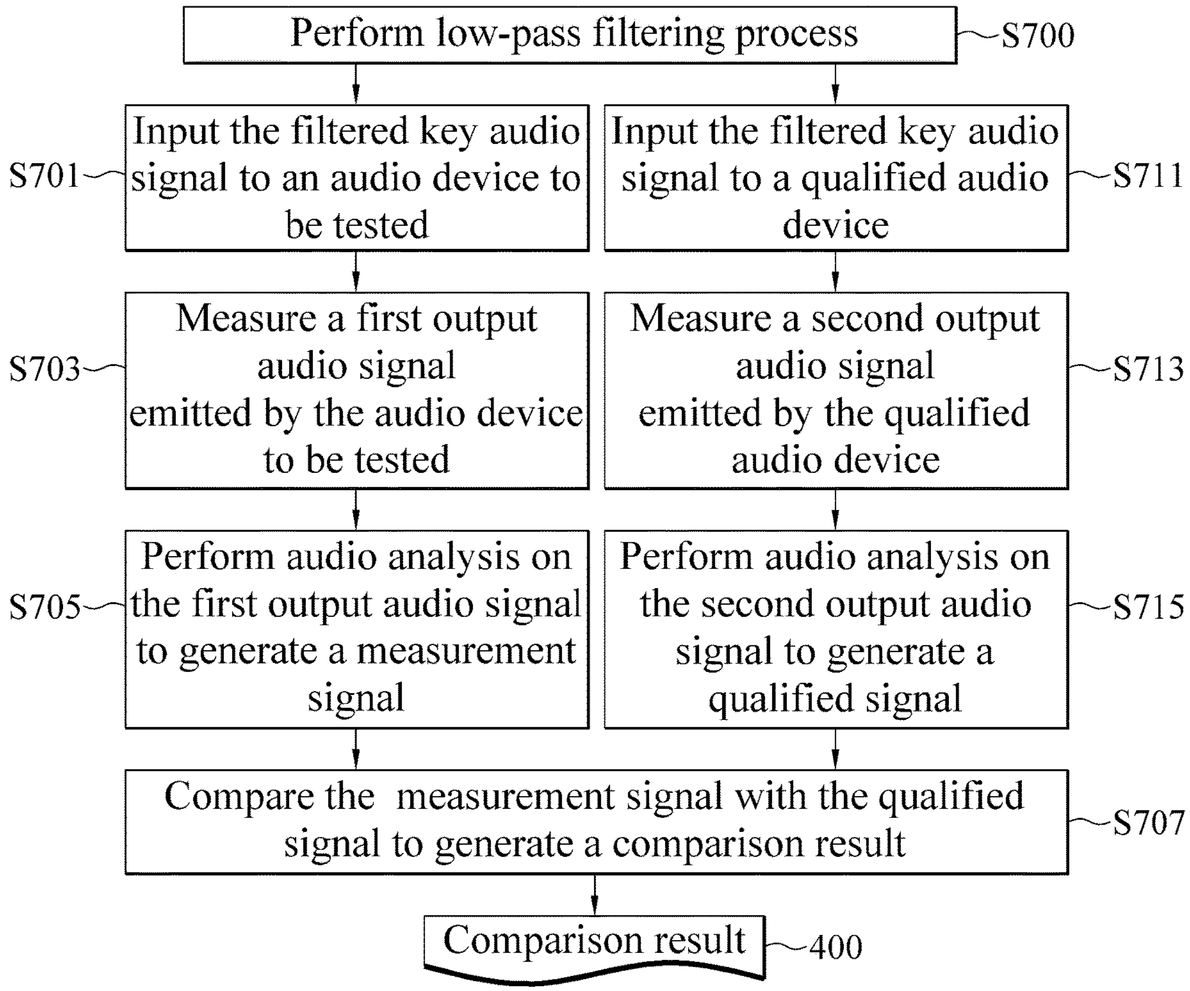
FIG. 7 illustrates a schematic flow chart of a noise detection method according to some embodiments of the present application.

Refer to FIG. 7, illustrating a schematic flow chart of a noise detection method according to some embodiments of the present application. Since steps S703, S705, S707, S713, and S715 are respectively the same as steps S203, S205, S207, S303, and step S305, they will not be repeated here. In some embodiments, the processing circuit 150 first performs the low-pass filtering process on the key audio signal KA to generate the filtered key audio signal KA (step S700). After that, the processing circuit 150 controls the input-output circuit 110 to input the filtered key audio signal KA to the audio device to be tested 200 and qualified audio device 300 (step 701 and step 711) and executes the subsequent steps. In this way, the high-frequency energy in the measurement signal and the qualified signal is filtered (i.e. the measurement signal and the qualified signal can respectively form the aforementioned filtered measurement signal and the aforementioned filtered qualified signal), and the interference during the low-pass filtering process is reduced. For example, prevent some interference energy generated by the noise detection device 100 during operation from affecting the low-pass filtering process.

In some embodiments, the processing circuit 150 may have a low-pass filter built in it (not shown), or the noise detection device may further include a low-pass filter (not shown), and the processing circuit 150 performs the low-pass filtering process through the low-pass filter. The low-pass filter is, for example, an R-C low-pass filter.

In some embodiments, a low-pass cutoff frequency of the low-pass filtering process is a lowest resonant frequency ($F_0$) of the audio device to be tested 200 or the qualified audio device 300. The lowest resonant frequency is the frequency corresponding to the first maximum value in the impedance curve of the audio device. Since the amplitude of the output audio signal of the audio device will be greatly attenuated at a frequency greater than the lowest resonant frequency (e.g., 600 Hz), such that the amplitude of the noise is also relatively small and can be ignored. Therefore, by setting the low-pass cutoff frequency of the low-pass filtering process to the lowest resonant frequency, the efficiency of noise detection can be improved. In some embodiments, a low-pass cutoff frequency of the low-pass filtering process is less than five times a lowest resonant frequency ($F_0$) of the audio device to be tested 200 or the qualified audio device 300. For example, if the lowest resonant frequency ($F_0$) is 600 Hz, a low-pass cutoff frequency may be 3000 Hz or less than 30000 Hz. In some embodiments, a low-pass cutoff frequency of the low-pass filtering process is between one and five times a lowest resonant frequency ($F_0$) of the audio device to be tested 200 or the qualified audio device 300. For example, if the lowest resonant frequency ($F_0$) is 600 Hz, a low-pass cutoff frequency may be between 600 Hz and 3000 Hz.

In some embodiments of step S207, step 407, or step 707, the processing circuit 150 calculates, at the same frequency, a difference value between the sound intensity of the measurement signal and the sound intensity of the qualified signal and compares the difference value with a difference threshold to generate the comparison result 400. Wherein, the difference threshold may be pre-stored in the processing circuit 150 or the storage circuit (not shown) of the noise detection device 100, or may be input by the user through an input interface (e.g., a keyboard, a mouse, etc.). In some embodiments, the same frequency may be the same frequency point or the same frequency band. The sound intensity can be the response amplitude value of the measurement signal and the qualified signal at a certain frequency point or at a certain frequency band respectively captured by the processing circuit 150, or the calculation value after averaging the response amplitude values of a certain captured frequency band. The difference value can be obtained by the processing circuit 150 after subtracting the sound intensity of the qualified signal from the sound intensity of the measurement signal or be obtained after subtracting the sound intensity of the measurement signal from the sound intensity of the qualified signal. In some embodiments, if the difference threshold is defined as an absolute difference threshold, the processing circuit 150 can perform an absolute value operation on the difference value to ensure that the difference value can be compared with the difference threshold.

Refer to FIG. 4 again. In some embodiments, the processing circuit 150 determines, based on the comparison result 400, whether the difference value between the sound intensity of the measurement signal and the sound intensity of the qualified signal under the same frequency is greater than the difference threshold (step S420). When the difference value is greater than the difference threshold, the processing circuit 150 determines that the first output audio signal OAT has noise (step S422), that is, the comparison result 400 at this time is "with noise". When the difference value is not greater than the difference threshold, the processing circuit 150 determines that the first output audio signal OAT has no noise (step S424), that is, the comparison result 400 at this time is "without noise".

Specifically, when the difference value is greater than the difference threshold, it represents that there is a certain degree of difference ratio between the first output audio signal OAT corresponding to the measurement signal and the second output audio signal OAG under a certain frequency or a certain frequency band, and this difference ratio is the noise energy. An example is given for illustrating. In some cases, the audio device to be tested 200 does not completely emit or cannot emit an output audio signal at a certain frequency or a certain frequency band, resulting in the sound intensity of the measurement signal at that frequency or that frequency band is less than the sound intensity of the qualified signal, and the difference value between these two sound intensities is greater than the difference threshold, then the audio signal output by the audio device to be tested 200 can be determined to have noise or be distorted. In some other cases, the audio device to be tested 200 produces abnormal resonance when outputting an audio signal under a certain frequency or a certain frequency band, resulting in the sound intensity of the measurement signal at that frequency or that frequency band is greater than the sound intensity of the qualified signal, and the difference value between these two sound intensities is greater than the difference threshold, then the audio signal output by the audio device to be tested 200 can be determined to have noise or be distorted.

Another example is given for illustrating. Since the high-frequency energy in the measurement signal and the qualified signal has been filtered out after the low-pass filtering process, under the same frequency (e.g., in the high-frequency part), when the sound intensity of the measurement signal is still greater than the sound intensity of the qualified signal and the difference value between these two sound intensities is greater than the difference threshold, it represents that the extra energy is the energy of the noise. In other words, at this time, the processing circuit 150 determines that the first output audio signal OAT has noise. For example, as shown in FIG. 6, the difference value at position A between the sound intensity of curve L3 (i.e., measurement signal) and the sound intensity of curve L4 (i.e., qualified signal) is greater than the difference threshold, that is, the first output audio signal OAT corresponding to curve L3 has noise (specifically, curve L3 has noise energy at position A). In this way, while improving the efficiency of noise detection, it is possible to accurately determine whether the first output audio signal OAT has noise. In some embodiments, the difference threshold is, for example, but not limited to, 2 dB to 4 dB.

In some embodiments, the processing circuit 150 can determine the amount of noise in the first output audio signal OAT by measuring the difference value between the sound intensity of the measurement signal and the sound intensity of the qualified signal. Wherein, the magnitude of the difference value may be an absolute magnitude, that is, the magnitude of the difference value after being performed the absolute value calculation.

Figure 8:
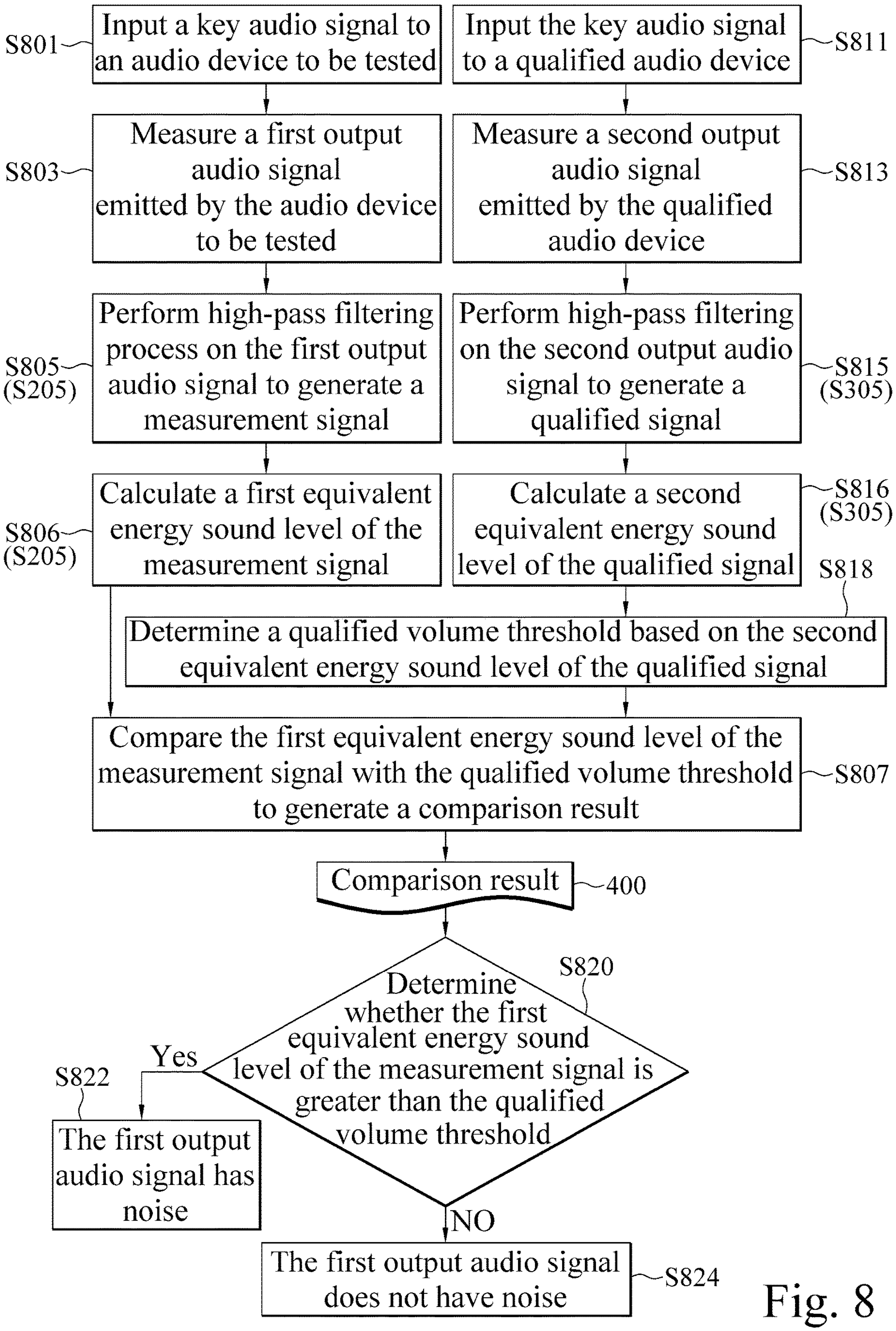
FIG. 8 illustrates a schematic flow chart of a noise detection method according to some embodiments of the present application.

Refer to FIG. 8, illustrating a schematic flow chart of a noise detection method according to some embodiments of the present application. Since steps S801, S803, S811, and S813 are respectively the same as steps S201, S203, S301, and S303, they will not be repeated here. In some embodiments, the step of the processing circuit 150 performing audio analysis on the first output audio signal OAT to generate the measurement signal (step S205) includes the processing circuit 150 performing a high-pass filtering process on the first output audio signal OAT to generate the measurement signal (step S805) and the processing circuit 150 calculating an equivalent energy sound level (Leq) (hereinafter referred to as a first equivalent energy sound level) of the measurement signal (step S806). Similarly, in some embodiments, the step of the processing circuit 150 performing audio analysis on the second output audio signal OAG to generate the qualified signal (step S305) includes the processing circuit 150 performing a high-pass filtering process on the second output audio signal OAG to generate the qualified signal (step S815) and the processing circuit 150 calculating an equivalent energy sound level (hereinafter referred to as a second equivalent energy sound level) of the qualified signal (step S816). Wherein, the processing circuit 150 may perform the same high-pass filtering process on the first output audio signal OAT and the second output audio signal OAG. The equivalent energy sound level is the average value of the energy measured in a specific period. Since the equivalent energy sound level is generally required to be calculated through high-frequency signals, the high-pass filtering process is to make the measurement signal and the qualified signal to be composed of high frequencies.

Next, the processing circuit 150 determines the magnitude of a qualified volume threshold according to the second equivalent energy sound level of the qualified signal (step S818). For example, the qualified volume threshold is not greater than the second equivalent energy sound level of the qualified signal. Since the qualified audio device 300 has undergone noise detection and noise correction, the second output audio signal OAG does not have noise, and the qualified signal also does not have the energy of noise. Therefore, by determining the qualified volume threshold according to the second equivalent energy sound level of the qualified signal and setting the qualified volume threshold as an upper limit, the measurement signal and the qualified signal can be compared under the same base, thereby ensuring the accuracy of noise detection.

After that, the processing circuit 150 compares the first equivalent energy sound level of the measurement signal with the qualified volume threshold to generate the comparison result 400 (step S807). In this way, the processing circuit 150 performs the comparison by using a single value instead of performing a multi-point sampling comparison by using a signal curve, thereby saving the calculation performance of the processing circuit 150.

In some embodiments, as shown in FIG. 8, the processing circuit 150 determines whether the first equivalent energy sound level of the measurement signal is greater than the qualified volume threshold based on the comparison result 400 (step S820). When the first equivalent energy sound level of the measurement signal is greater than the qualified volume threshold, it represents that the extra energy is the energy of noise, thus the processing circuit 150 determines that the first output audio signal OAT has noise (step S822), that is the comparison result 400 at this time is "with noise". In other words, when the first equivalent energy sound level of the measurement signal exceeds the qualified volume threshold served as the upper limit, it represents that the first output audio signal OAT has noise. When the first equivalent energy sound level of the measurement signal is not greater than the qualified volume threshold, the processing circuit 150 determines that the first output audio signal OAT does not have noise (step S824), that is the comparison result 400 at this time is "without noise". In other words, when the first equivalent energy sound level of the measurement signal does not exceed the qualified volume threshold served as the upper limit, it represents that the first output audio signal OAT does not have noise. In this way, while saving computing performance, it is possible to accurately determine whether the first output audio signal OAT has noise.

In some embodiments, the processing circuit 150 can subtract the qualified volume threshold from the first equivalent energy sound level of the measurement signal to determine the amount of noise in the first output audio signal OAT.

In some embodiments, the processing circuit 150 can calculate the first equivalent energy sound level of the measurement signal and the second equivalent energy sound level of the qualified signal according to equation 1. Wherein, $L_{eq}$ is an equivalent energy sound level, T is a measurement time, $P_t$ is a measurement sound pressure, and $P_0$ is a basic sound pressure (e.g., 20 μPa).

$$L_{eq} = 10\log\frac{1}{T}\int_0^T\left(\frac{P_t}{P_0}\right)^2 dt \qquad \text{(equation 1)}$$

In some embodiments, the qualified volume threshold may be pre-stored in the processing circuit 150 or a storage circuit (not shown) of the noise detection device 100. For example, after generating the qualified volume threshold through steps S811 to S818, the processing circuit 150 stores the qualified volume threshold in it or the storage circuit for subsequent use directly (e.g., when performing step S807, the qualified volume threshold is obtained and used directly from the processing circuit 150 or the storage circuit), and there is no need to perform sound recording and signal processing each time when it wants to use the qualified volume threshold.

In some embodiments, the processing circuit 150 may have a high-pass filter built in it (not shown), or the noise detection device 100 may further include a high-pass filter (not shown), and the processing circuit 150 performs the high-pass filtering process through the high-pass filter. The high-pass filter is, for example, an R-C high-pass filter.

In some embodiments, before the processing circuit 150 performing a high-pass filtering process on the first output audio signal OAT and the second output audio signal OAG to calculate equivalent energy sound levels of the qualified signal and the measurement signal, the processing circuit 150 performs the low-pass filtering process on the key audio signal KA to generate the filtered key audio signal KA in advance and then inputs the filtered key audio signal KA to the audio device to be tested 200 and qualified audio device 300 to generate the first output audio signal OAT and the second output audio signal OAG. Next, the high-pass filtering process is performed on the first output audio signal OAT and the second output audio signal OAG so as to calculate equivalent energy sound levels of the qualified signal and the measurement signal, determine the magnitude of the qualified volume threshold, and compare the first equivalent energy sound level of the measurement signal with the qualified volume threshold to generate the comparison result 400. In some embodiments, a low-pass cutoff frequency of the low-pass filtering process is a lowest resonant frequency ($F_0$) of the audio device to be tested 200 or the qualified audio device 300.

Figure 9:
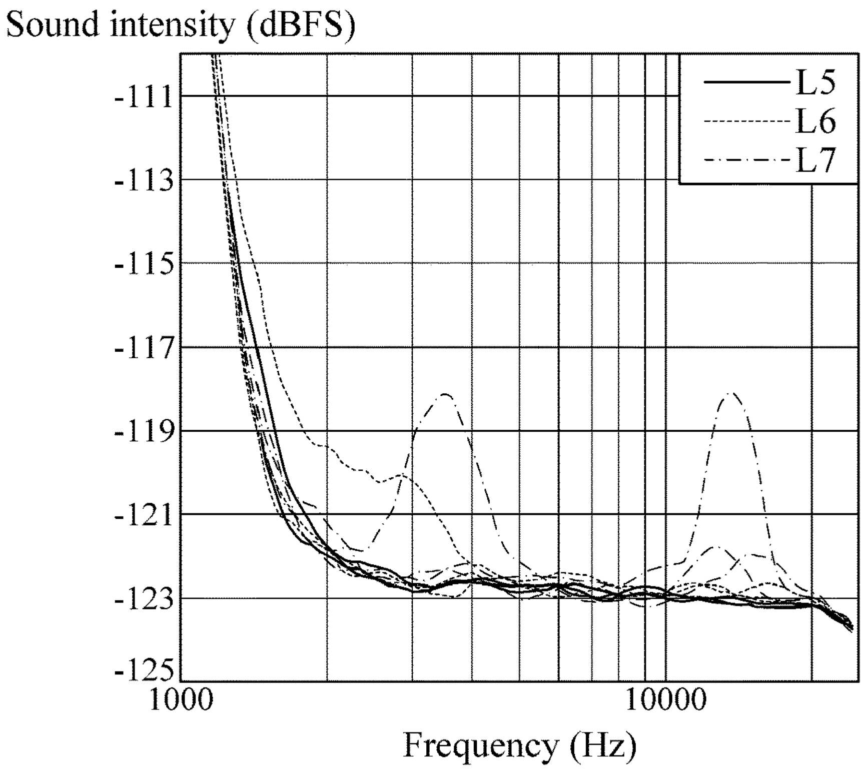
FIG. 9 illustrates a schematic diagram of the experimental data according to some embodiments of the present application.
Figure 10:
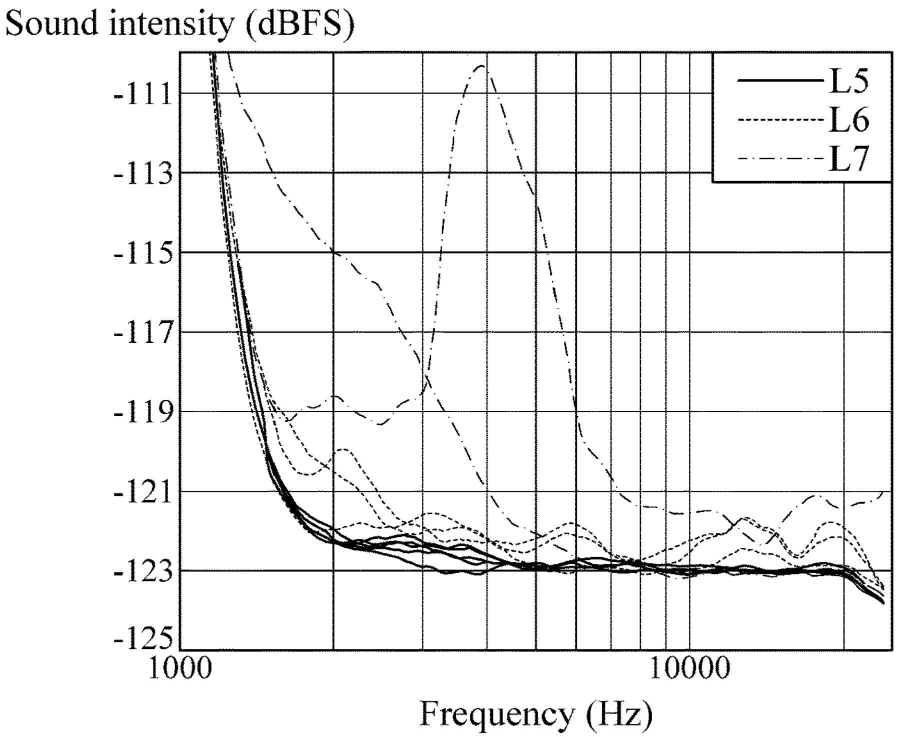
FIG. 10 illustrates a schematic diagram of the experimental data according to some embodiments of the present application.

Refer to FIG. 9 and FIG. 10. FIG. 9 and FIG. 10 are schematic diagrams of the experimental data according to some embodiments of the present application. FIG. 9 and FIG. 10 use different types of audio devices. Curve L5 (represented by the solid line) is the qualified signal, and curve L6 (represented by the dashed line) and curve L7

(represented by the single dotted chain line) are measurement signals. It can be seen from FIG. 9 and FIG. 10 that curve L6 and curve L7 have larger sound intensity at part of the positions compared to curve L5. The difference value between the sound intensity of curve L6 at that part of the positions and the sound intensity of curve L5 at that part of the positions is greater than the difference threshold, and the difference value between the sound intensity of curve L7 at that part of the positions and the sound intensity of curve L5 at that part of the positions is greater than the difference threshold. Therefore, these difference values are namely the noise energy. Furthermore, it can also be seen from FIG. 9 and FIG. 10 that the overall degree of differences between curve 6 and curve 5 and between curve 7 and curve 5 are relatively large. Therefore, by comparing the measurement signal with the qualified signal, it can be easy and quick to determine whether the first output audio signal OAT corresponding to the measurement signal has noise.

In sum, according to some embodiments, through the key audio signal with multiple frequencies and/or irregular amplitude variation, the measurement signal of the audio device to be tested is caused to have multiple frequencies and/or irregular amplitude variation, and through the comparison result generated by comparing the measurement signal with the qualified signal corresponding to the qualified audio device, whether the audio signal emitted by the audio device to be tested has noise can be accurately determined.

What is claimed is:

1. A noise detection method, comprising:

inputting a key audio signal with multiple frequencies to an audio device to be tested;

measuring a first output audio signal emitted by the audio device to be tested;

performing an audio analysis on the first output audio signal to generate a measurement signal;

inputting the key audio signal to a qualified audio device;

measuring a second output audio signal emitted by the qualified audio device;

performing the audio analysis on the second output audio signal to generate a qualified signal; and comparing the measurement signal with the qualified signal to generate a comparison result, and determining whether the first output audio signal has noise based on the comparison result.

2. The noise detection method according to claim 1, wherein the steps of performing the audio analysis on the first output audio signal to generate the measurement signal and performing the audio analysis on the second output audio signal to generate the qualified signal further comprises:

performing a Fourier transform on the first output audio signal and the second output audio signal to generate the measurement signal and the qualified signal;

wherein, the step of determining whether the first output audio signal has noise comprises: under the same frequency, determining the first output audio signal has noise when a difference value between a sound intensity of the measurement signal and a sound intensity of the qualified signal is greater than a difference threshold.

3. The noise detection method according to claim 2, further comprising:

performing a low-pass filtering process on the measurement signal and the qualified signal to generate the filtered measurement signal and the filtered qualified signal;

wherein, the step of generating the comparison result comprises: comparing the filtered measurement signal with the filtered qualified signal to generate the comparison result.

4. The noise detection method according to claim 3, wherein a low-pass cutoff frequency of the low-pass filtering process is a lowest resonant frequency of the audio device to be tested.

5. The noise detection method according to claim 2, further comprising:

performing a low-pass filtering process on the key audio signal to generate the filtered key audio signal;

wherein, the steps of inputting the key audio signal to the audio device to be tested and measuring the first output audio signal emitted by the audio device to be tested further comprise: inputting the filtered key audio signal to the audio device to be tested and measuring the first output audio signal emitted by the audio device to be tested; and wherein, the steps of inputting the key audio signal to the qualified audio device and measuring the second output audio signal emitted by the qualified audio device further comprise: inputting the filtered key audio signal to the qualified audio device and measuring the second output audio signal emitted by the qualified audio device.

6. The noise detection method according to claim 5, wherein a low-pass cutoff frequency of the low-pass filtering process is less than five times a lowest resonant frequency of the audio device to be tested.

7. The noise detection method according to claim 1, wherein the steps of performing the audio analysis on the first output audio signal to generate the measurement signal and performing the audio analysis on the second output audio signal to generate the qualified signal further comprise:

performing a high-pass filtering process on the first output audio signal and the second output audio signal to generate the measurement signal and the qualified signal, and calculating a first equivalent energy sound level of the measurement signal and a second equivalent energy sound level of the qualified signal;

wherein, the steps of generating the comparison result and determining whether the first output audio signal has noise comprise: determining a magnitude of a qualified volume threshold according to the second equivalent energy sound level, comparing the first equivalent energy sound level with the qualified volume threshold to generate the comparison result, and determining the first output audio signal has noise when the first equivalent energy sound level is greater than the qualified volume threshold.

8. The noise detection method according to claim 7, further comprising:

performing a low-pass filtering process on the key audio signal to generate the filtered key audio signal;

wherein, the steps of inputting the key audio signal to the audio device to be tested and measuring the first output audio signal emitted by the audio device to be tested further comprise: inputting the filtered key audio signal to the audio device to be tested and measuring the first output audio signal emitted by the audio device to be tested; and wherein, the steps of inputting the key audio signal to the qualified audio device and measuring the second output audio signal emitted by the qualified audio device further comprise: inputting the filtered key audio signal to the qualified audio device and measuring the second output audio signal emitted by the qualified audio device.

9. The noise detection method according to claim 8, wherein a low-pass cutoff frequency of the low-pass filtering process is less than five times a lowest resonant frequency of the audio device to be tested.

10. The noise detection method according to claim 1, wherein the key audio signal has a multi-frequency audio signal having multiple frequencies on a time domain, and the multiple frequencies of the multi-frequency audio signal have an irregular amplitude variation on the time domain.

11. A noise detection device, comprising:

an input-output circuit, configured to input a key audio signal with multiple frequencies to an audio device to be tested;

a measurement circuit, configured to measure a first output audio signal emitted by the audio device to be tested; and a processing circuit, configured to perform an audio analysis on the first output audio signal to generate a measurement signal, compares the measurement signal with a qualified signal to generate a comparison result and determines whether the first output audio signal has noise based on the comparison result, wherein the input-output circuit inputs the key audio signal to a qualified audio device, the measurement circuit measures a second output audio signal emitted by the qualified audio device, and the processing circuit performs the audio analysis on the second output audio signal to generate the qualified signal.

12. The noise detection device according to claim 11, wherein the processing circuit is configured to perform a Fourier transform on the first output audio signal and the second output audio signal to generate the measurement signal and the qualified signal, and under the same frequency, the processing circuit determines the first output audio signal has noise when a difference value between a sound intensity of the measurement signal and a sound intensity of the qualified signal is greater than a difference threshold.

13. The noise detection device according to claim 12, wherein the processing circuit performs a low-pass filtering process on the measurement signal and the qualified signal to generate the filtered measurement signal and the filtered qualified signal, and the processing circuit compares the filtered measurement signal with the filtered qualified signal to generate the comparison result.

14. The noise detection device according to claim 13, wherein a low-pass cutoff frequency of the low-pass filtering process is a lowest resonant frequency of the audio device to be tested.

15. The noise detection device according to claim 12, wherein the processing circuit performs a low-pass filtering process on the key audio signal to generate the filtered key audio signal; and wherein the input-output circuit inputs the filtered key audio signal to the audio device to be tested, measures the first output audio signal emitted by the audio device to be tested, inputs the filtered key audio signal to the qualified audio device, and measures the second output audio signal emitted by the qualified audio device.

16. The noise detection device according to claim 15, wherein a low-pass cutoff frequency of the low-pass filtering process is less than five times a lowest resonant frequency of the audio device to be tested.

17. The noise detection device according to claim 11, wherein the processing circuit is configured to perform a high-pass filtering process on the first output audio signal and the second output audio signal to generate the measurement signal and the qualified signal, calculates a first equivalent energy sound level of the measurement signal and a second equivalent energy sound level of the qualified signal, determines a magnitude of a qualified volume threshold according to the second equivalent energy sound level, compares the first equivalent energy sound level with the qualified volume threshold to generate the comparison result, and determines the first output audio signal has noise when the first equivalent energy sound level is greater than the qualified volume threshold.

18. The noise detection device according to claim 17, wherein the processing circuit performs a low-pass filtering process on the key audio signal to generate the filtered key audio signal; and wherein the input-output circuit inputs the filtered key audio signal to the audio device to be tested, measures the first output audio signal emitted by the audio device to be tested, inputs the filtered key audio signal to the qualified audio device, and measures the second output audio signal emitted by the qualified audio device.

19. The noise detection device according to claim 18, wherein a low-pass cutoff frequency of the low-pass filtering process is less than five times a lowest resonant frequency of the audio device to be tested.

20. The noise detection device according to claim 11, wherein the key audio signal has a multi-frequency audio signal composed of multiple frequencies on a time domain, and the multiple frequencies of the multi-frequency have an irregular amplitude variation on the time domain.

* * * * *